(12) United States Patent
Park

(10) Patent No.: US 8,473,782 B2
(45) Date of Patent: Jun. 25, 2013

(54) METHOD FOR DATA SYNCHRONIZATION AND MOBILE TERMINAL USING THE SAME

(75) Inventor: Sangjoo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 245 days.

(21) Appl. No.: 12/939,127

(22) Filed: Nov. 3, 2010

(65) Prior Publication Data

US 2012/0011399 A1   Jan. 12, 2012

(30) Foreign Application Priority Data

Jul. 8, 2010   (KR) .................. 10-2010-0066019

(51) Int. Cl.
*G06F 11/00*   (2006.01)
(52) U.S. Cl.
USPC .................................... 714/16; 714/15; 714/2
(58) Field of Classification Search
USPC ...................................... 714/16, 19
See application file for complete search history.

(56) References Cited

U.S. PATENT DOCUMENTS

| 6,745,303 | B2* | 6/2004 | Watanabe | 711/161 |
|---|---|---|---|---|
| 7,818,754 | B2* | 10/2010 | Morris et al. | 719/318 |
| 2005/0033561 | A1* | 2/2005 | Orofino | 703/1 |
| 2010/0037088 | A1* | 2/2010 | Krivopaltsev et al. | 714/4 |
| 2010/0058120 | A1* | 3/2010 | Coleman et al. | 714/57 |

* cited by examiner

*Primary Examiner* — Scott Baderman
*Assistant Examiner* — Sarai Butler
(74) *Attorney, Agent, or Firm* — Birch, Stewart, Kolasch & Birch, LLP

(57) ABSTRACT

A method of controlling a mobile terminal, method including performing, via a controller on the mobile terminal, data synchronizations with at least one external device, displaying, via a display on the mobile terminal, a list of data synchronization history corresponding to the performed data synchronizations, determining, via the controller, whether or not a particular data synchronization from the list includes an error, undoing, via the controller, the particular data synchronization to a state prior to the particular data synchronization, if it is determined that the particular data synchronization includes the error, and re-performing, via the controller, the particular data synchronization using data corresponding to the undone particular data synchronization.

20 Claims, 3 Drawing Sheets

METHOD FOR DATA SYNCHRONIZATION AND MOBILE TERMINAL USING THE SAME

CROSS-REFERENCE TO RELATED APPLICATION

Pursuant to 35 U.S.C. §119(a), this application claims the benefit of earlier filing date and right of priority to Korean Application No. 10-2010-0066019, filed on Jul. 8, 2010, the contents of which is incorporated by reference herein in its entirety.

BACKGROUND OF THE INVENTION

1. Field of the Invention

The present disclosure relates to a digital data processing, and particularly, to a data synchronization method and a mobile terminal using the same.

2. Background of the Invention

Terminals may be divided into mobile/portable terminals and stationary terminals according to their mobility. Also, the mobile terminals may be categorized into a handheld terminal and a vehicle mount terminal according to whether it is directly portable by a user.

As it becomes multifunctional, the terminal can be allowed to capture still images or moving images, play music or video files, play games, receive broadcast and the like, so as to be implemented as an integrated multimedia player. Various attempts have been done for the terminal by hardware or software in order to support and implement such complicated functions.

In general, the conventional terminal is being evolved into a form of continuously extending an interconnection with an Internet, thus terminals are interacting with each other through various types of services. Under this environment, a significant issue is data synchronization among services executed in a terminal operating in connection with the Internet. For instance, a plurality of terminals upload their own data and programs to a central server, and then are allowed to download or synchronize needed data and programs.

However, as the conventional terminal performs a plurality of data synchronization operations, data loss occurs during the data synchronization or data deletion occurs due to a synchronization error, accordingly, a user suffers from individual recovery of lost data or deleted data.

SUMMARY OF THE INVENTION

Therefore, an object of the present disclosure is to provide a data synchronization method, which allows a user to easily recover (correct) an error if such error is present in synchronized data, and a mobile terminal using the same.

To achieve these and other advantages and in accordance with the purpose of the present disclosure, as embodied and broadly described herein, there is provided a data synchronization method in a mobile terminal including performing data synchronizations with at least one external device, displaying histories of the performed data synchronizations, undoing synchronization data of a history having an error occurred, of the displayed histories, to a state prior to the synchronization, and re-performing the data synchronization using the undone synchronization data.

The external device may be either a mobile terminal or a server.

The data synchronization history may be displayed for each external device or for each data.

The undoing to the state prior to the synchronization may be performed according to a user's command or automatically upon occurrence of the data synchronization error.

The method may further include performing the data synchronization with the external device periodically or occasionally to update the synchronization history.

In accordance with one embodiment, there is provided a mobile terminal including a wireless communication unit performing data synchronizations with at least one external device, a display unit displaying histories of the performed data synchronizations, and a controller undoing synchronization data of a history having an error occurred, of the displayed histories, to a state prior to the synchronization, and re-performing the data synchronization using the undone synchronization data.

In accordance with the data synchronization method and the mobile terminal using the same according to at least one embodiment, the data undoing to a point to be undone for each server and for each data can be supported under an environment that a plurality of data synchronization services are executed, which allows a user to easily undo data loss or data deletion due to a synchronization error.

To achieve these and other advantages and in accordance with the purpose of the present disclosure, as embodied and broadly described herein, there is provided a data synchronization method in a mobile terminal including performing, via a controller on the mobile terminal, data synchronizations with at least one external device, displaying, via a display on the mobile terminal, a list of data synchronization history corresponding to the performed data synchronizations, determining, via the controller, whether or not a particular data synchronization from the list includes an error, undoing, via the controller, the particular data synchronization to a state prior to the particular data synchronization, if it is determined that the particular data synchronization includes the error, and re-performing, via the controller, the particular data synchronization using data corresponding to the undone particular data synchronization.

In accordance with one embodiment, there is provided a mobile terminal including a wireless communication unit configured to perform data synchronizations with at least one external device, a display unit configured to display a list of data synchronization history corresponding to the performed data synchronizations, and a controller configured to determine whether or not a particular data corresponding to a particular data synchronization from the list includes an error, to undo a particular data synchronization from the list to a state prior to the particular data synchronization if it is determined that the particular data synchronization includes the error, and to re-perform the particular data synchronization using data corresponding to the undone particular data synchronization.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Embodiments of the present disclosure will be described below in detail with reference to the accompanying drawings, where those components are rendered the same reference number that are the same or are in correspondence, regardless of the figure number, and redundant explanations are omitted. In describing the present disclosure, if a detailed explanation for a related known function or construction is considered to unnecessarily divert the gist of the present disclosure, such explanation has been omitted but would be understood by those skilled in the art. In the following description, usage of suffixes such as 'module', 'part' or 'unit' used for referring to elements is given merely to facilitate explanation of the present disclosure, without having any significant meaning by itself. In describing the present disclosure, if a detailed explanation for a related known function or construction is considered to unnecessarily divert the gist of the present disclosure, such explanation has been omitted but would be understood by those skilled in the art. The accompanying drawings of the present disclosure aim to facilitate understanding of the present disclosure and should not be construed as limited to the accompanying drawings.

Overall Configuration of Mobile Terminal

The mobile terminal described in the present disclosure may include mobile phones, smart phones, notebook computers, digital broadcast receivers, PDAs (Personal Digital Assistants), PMPs (Portable Multimedia Player), navigation devices, and the like. It would be understood by a person in the art that the configuration according to the embodiments of the present disclosure can be also applicable to the fixed types of terminals such as digital TVs, desk top computers, or the like, except for any elements especially configured for a mobile purpose.

Figure 1:
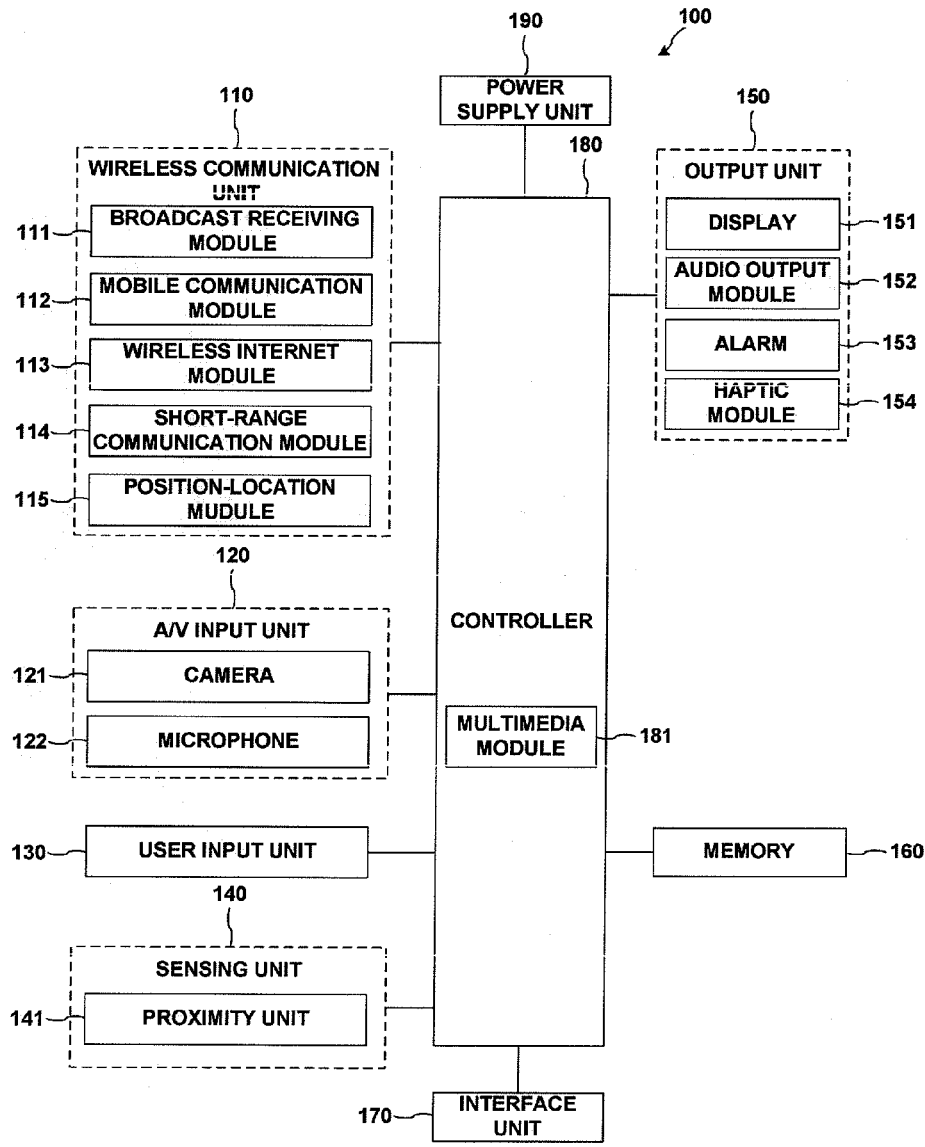
FIG. 1 is a schematic block diagram of a mobile terminal according to an embodiment of the present disclosure.

FIG. 1 is a schematic block diagram of a mobile terminal according to an embodiment of the present disclosure.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, and the like. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit 110 may include at least one of a broadcast receiving module 111, a mobile communication module 112, a wireless Internet module 113, a short-range communication module 114, and a position-location module 115.

The broadcast receiving module 111 receives broadcast signals and/or broadcast associated information from an external broadcast management server (or other network entity) via a broadcast channel. The broadcast associated information may refer to information associated with a broadcast channel, a broadcast program or a broadcast service provider. The broadcast associated information may also be provided via a mobile communication network and, in this case, the broadcast associated information may be received by the mobile communication module 112. Broadcast signals and/or broadcast-associated information received via the broadcast receiving module 111 may be stored in the memory 160 (or another type of storage medium).

The mobile communication module 112 transmits and/or receives radio signals to and/or from at least one of a base station (e.g., access point, Node B, and the like), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), LTE (Long Term Evolution), LTE-A (Long Term Evolution Advanced) or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The position-location module 115 is a module for checking or acquiring a location (or position) of the mobile terminal. A typical example of the position-location module is a GPS (Global Positioning System).

With reference to FIG. 1, the A/V input unit 120 receives an audio or image signal. The A/V input unit 120 may include a camera 121 (or other image capture device) or a microphone 122 (or other sound pick-up device). The camera 121 processes image frames of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal. The user input unit 130 may include a keypad, a dome switch, a touch pad (e.g., a touch sensitive member that detects changes in resistance, pressure, capacitance, and the like, due to being contacted), a jog wheel, a jog switch, and the like.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, and the like, and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity unit 141.

The output unit 150 is configured to provide outputs in a visual, audible, and/or tactile manner (e.g., audio signal, image signal, alarm signal, vibration signal, etc.). The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, and the like.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, an e-ink display, or the like.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units (or other display means) according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may convert pressure applied to a particular portion of the display unit 151 or a change in the capacitance or the like generated at a particular portion of the display unit 151 into an electrical input signal. The touch sensor may detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity unit 141 may be disposed within or near the touch screen. The proximity unit 141 is a sensor for detecting the presence or absence of an object relative to a certain detection surface or an object that exists nearby by using the force of electromagnetism or infrared rays without a physical contact. Thus, the proximity unit 141 has a considerably longer life span compared with a contact type sensor, and it can be utilized for various purposes.

Examples of the proximity unit 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity unit.

The audio output module 152 may convert and output sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a receiver, a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, and the like, an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or XD memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal 100. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Method for Processing User Input with Respect to Mobile Terminal

The user input units 130 is manipulated to receive a command for controlling the operation of the mobile terminal 100 and may include a plurality of manipulation units 131 and 132. The manipulation units 131 and 132 may be generally referred to as a manipulating portion, and various methods and techniques can be employed for the manipulation portion so long as they can be operated by the user in a tactile manner.

The display unit 151 can display various types of visual information. These information may be displayed in the form of characters, numerals, symbols, graphic or icons. In order to input such information, at least one of the characters, numerals, symbols, graphic and icons may be displayed in predetermined arrangement in the form of a keypad. Also, the keypad can be referred to as a 'soft key'.

The display unit 151 may be operated as an entire area or may be divided into a plurality of regions so as to be operated. In the latter case, the plurality of regions may be configured to be operated in association with each other.

For example, an output window and an input window may be displayed at an upper portion and a lower portion of the display unit 151. The output window and the input window are regions allocated to output or input information, respectively. Soft keys marked by numbers for inputting a phone number or the like may be outputted to the input window. When a soft key is touched, a number or the like corresponding to the touched soft key may be displayed on the output window. When the manipulation unit is manipulated, a call connection to the phone number displayed on the output window may be attempted or text displayed on the output window may be inputted to an application.

The display unit 151 or a touch pad may be configured to receive a touch through scrolling. The user can move an entity displayed on the display unit 151, for example, a cursor or a pointer positioned on an icon or the like, by scrolling the touch pad. In addition, when the user moves his finger on the display unit 151 or on the touch pad, a path along which the user's finger moves may be visually displayed on the display unit 151. This can be useful in editing an image displayed on the display unit 151.

A certain function of the terminal may be executed when the display unit 151 (touch screen) and the touch pad are touched together within a certain time range. For example, the display unit 151 and the touch pad may be touched together when the user clamps the terminal body by using his thumb and index fingers. The certain function may be activation or deactivation of the display unit 151 or the touch pad.

Exemplary embodiments related to a control method that can be implemented in the terminal configured as described above will now be described with reference to the accompanying drawings. The exemplary embodiments to be described may be solely used or may be combined to be used. Also, the exemplary embodiments to be described may be combined with the foregoing user interface (UI) so as to be used.

Data Synchronization Method Between Terminals

With the rapid growth of internet technologies, especially, wireless internet-infra structures, a larger portion of traffic is occupied by data transmission and synchronization of terminals. For instance, data transmission and exchange of electronic mails, contact information, schedules and the like are widely executed among terminals via a personal information management service (PIMS) of a network server, and also, in many cases, information or data associated with a user are found in different types of terminals or servers due to an increase in the types or numbers of terminals belonging to the user.

Data synchronization between terminals is a method by which a plurality of terminals store or manage the same data, and representative examples of the method may include Open Mobile Alliance Data Synchronization (OMA DS) undergoing in an OMA standardization organization or Synchronization Markup Language (SyncML). Besides, Exchange ActiveSync (EAS) provides protocols for allowing terminal users to access electronic mails, schedules, contact information, tasks or the like. Internet service providers, such as Facebook or the like also provide solutions for data synchronization.

Data Synchronization Service

Data synchronization service may indicate an application, a program, a software, a firmware or a recording medium for recording thereof, by which the data synchronization among terminals is executed and accordingly data stored in the terminals are changed (generated, modified, deleted) so as to maintain data consistency among those terminals.

The data synchronization service may be executed by a terminal or a server.

Especially, the data synchronization service may be executed by both terminals which cooperate with each other, or both a terminal and a server which cooperate with each other. For example, the data synchronization service executed in a first terminal may operate in cooperation with the data synchronization service executed in a second terminal. Alternatively, the data synchronization service executed in a terminal may operate in cooperation with the data synchronization service executed in a server.

The data synchronization service executed respectively in the first and second terminals may be the same application (for example, peer-to-peer application), or applications which cooperate with each other but are different from each other (for example, applications with client-server relations). Similarly, the data synchronization services executed in the terminal and the server, respectively, may be the same application (for example, peer-to-peer application), or applications which cooperate with each other but are different from each other (for example, applications with client-server relations).

Alternatively, the data synchronization service may be executed in one of terminals which cooperatively work or executed in one of a terminal and a server which cooperatively work. For example, the data synchronization service executed in a first terminal may send a command, a control signal, a message, data or the like to a second terminal, thereby allowing data synchronization. Alternatively, the data synchronization service executed in a server may send a command, a control signal, a message, data or the like to a terminal, thereby achieving data synchronization.

Hereinafter, for the sake of explanation, description will be made under assumption that data synchronization services are cooperatively executed in a terminal and a server, as a type of application. Here, the embodiment that the data synchronization services are cooperatively executed, as a type of application, in the terminal and the server is merely illustrative, and it should be understood that the scope of the present disclosure is not limited to the embodiments. For example, the present disclosure may be applicable to another embodiment that the data synchronization services being executed as a type of firmware, or an embodiment that the data synchronization services operate in first and second terminals with cooperation with each other.

Meanwhile, the data synchronization service may be installed during fabrication of a terminal, or added or downloaded in the terminal via a wired/wireless interface after complete fabrication of the terminal.

Targets to be synchronized by the data synchronization service may include every available types of data or electronic files, such as mail, schedule, contact information, task, document, text, binary file and the like.

Data Synchronization Method and Mobile Terminal Using the Same

The present disclosure proposes a method of easily undoing (recovering, restoring, correcting) an error, such as data loss, data deletion or the like, when synchronized data has such error under an environment that a plurality of data synchronization services are executed. In particular, data undoing to a state to be undone for each server or for each data may be supported.

In detail, the mobile terminal 100 according to one embodiment may check whether or not the data synchronization service has changed data stored in the mobile terminal 100. For example, the mobile terminal 100 may check whether or not data is changed, in a periodical manner, according to a user's input or by receiving a notification from the data synchronization service.

In order to check whether the data has been changed, the mobile terminal 100 may check data change history information managed by the data synchronization service. For instance, if the data synchronization service manages a backup database by itself and provides a method for accessing data change history information stored in the backup database, the mobile terminal 100 may check the data change history information by accessing the backup database. Here, the access to the data change history information may be achieved by a software development kit (SDK), shared library, or other toolkits, provided by a data synchronization service developer.

Alternatively, the mobile terminal 100 may directly manage data change history information for tracking down data changes generated in each data synchronization service in a separate database managed by itself, and compare the latest version of data recorded in the database with current data stored in the mobile terminal 100, thereby checking whether or not the data has been changed.

Meanwhile, upon checking the change or non-change of data, the mobile terminal 100 may set the data synchronization service to send a notification or message indicating every time when a data change event is generated, thereby overcoming a burden of periodically or occasionally checking the data change or data non-change.

Hereinafter, for the sake of explanation, an embodiment is described under consumption that after a first terminal modifies data stored in the first terminal itself, the first terminal synchronizes the modified data with a server so as to update data stored in the server, and a second terminal synchronizes data stored in itself with the data stored in the server. Here, it is also assumed that the data synchronization service is executed as a type of application and operates in each of the second terminal and the server in a cooperative manner. However, the data synchronization by cooperation between the terminal and the server is merely illustrative, and it should be understood that the scope of the present disclosure may not be limited to the embodiment. For instance, the present disclosure may be applicable to data synchronization by cooperation between the first and second terminals as mentioned above.

Hereinafter, description will be given in detail of a function that the mobile terminal 100 checks or tracks down a history that the data synchronization service changes a target data to be synchronized (synchronization target data) stored in the mobile terminal 100.

Data Change History Tracking of Mobile Terminal

A data synchronization service application executed in the mobile terminal 100 according to the one embodiment may cooperate with a server to change (generate, modify, delete) a synchronization target data stored in the mobile terminal 100.

First, the controller 180 of the mobile terminal 100 checks whether or not the synchronization target data stored in the memory 160 has been changed.

The controller 180 may check the change or non-change in the synchronization target data by confirming a modified time of the synchronization target data.

Alternatively, the controller 180 may check the change or non-change in the synchronization target data directly or by inquiring to the data synchronization service when the data synchronization service maintains (stores, manages) the data change history information. To this end, the synchronization target data may be configured in a open or standardized format such that the controller 180 can directly check its contents. In addition, the data synchronization service may provide (notify) the controller 180 with the change or non-change of the synchronization target data or a current value of the synchronization target data in response to the inquiry of the controller 180. In this case, the data synchronization service may also provide a set of standardized commands which allow the inquiry of the data change history information.

As another case, if the data synchronization service does not maintain (store, manage) the data change history information, the controller 180 may separately maintain (store, manage) data change history information by itself and then check whether the synchronization target data has been changed by comparing current synchronization target data with the separately maintained (stored, managed) data change history information. That is, the controller 180 may record an initial value of synchronization target data in the data change history information, and thereafter periodically or occasionally check whether the synchronization target data has been changed. If so, the controller 180 may additionally record the changed synchronization target data in the data change history information for maintenance (storage, management).

The data change history information managed by the data synchronization service or the data change history information managed by the controller 180 other than the data synchronization service may be stored in the memory 160 or a server in the form of a database.

Meanwhile, the controller 180 may periodically check whether the synchronization target data has been changed. For instance, the controller 180 may execute a background application which periodically checks whether or not any change has occurred in the synchronization target data or the database storing the synchronization target data. Such background application may be useful especially when the data synchronization service does not manage the data change history information.

Alternatively, the controller 180 may check whether or not the synchronization target data has been changed according to a user's input or command. For instance, when an application, which performs the data synchronization method according to the one embodiment, is displayed on the display 151 (touch screen) and a user executes the application by selecting the same on the touch screen in a touching manner or by using a manipulation unit of the user input unit 130, the controller 180 may check the change or non-change of the synchronization target data according to a command code included in the application.

Or, the controller 180 may set the data synchronization service to notify the fact when the data synchronization service changes the synchronization target data, and if notified, check whether the synchronization target data has been changed. For example, the controller 180 may set up notification in a setup file of the data synchronization service, a registry referred by the data synchronization service or the like.

The controller 180 may also check whether or not the synchronization target data has been changed when the data synchronization service communicates with or performs data transmission and reception with another mobile terminal or server via the wireless communication unit 110 or the interface unit 170.

For example, the controller 180 may determine whether the data synchronization service communicates with or performs data transmission and reception with another mobile terminal or server according to whether the data synchronization service has been allocated or generated a hardware resource, a handler, an instance and an object for accessing the wireless communication unit 110 or the interface unit 170.

As such, description has been given of the function that the mobile terminal 100 checks or tracks down the history that the data synchronization service changes the synchronization target data stored in the mobile terminal 100.

Hereinafter, description will be given of a function that the mobile terminal 100 displays such data change history information and undoes such data to a previous data or a previous state according to a user's selection.

Display of Data Change History and Data Undoing in Mobile Terminal

The controller 180 may display data change history (data synchronization history) on the display 151. The controller 180 may display various types of synchronization related information, such as a data synchronized time, a target server of the data synchronization, contents of the data synchronization and the like. The contents of the data synchronization may include name, type, attribute value and the like of the synchronization target data, and the synchronization target data may include mail, schedule, contact information, task, document, text, binary file and the like.

Figure 2:
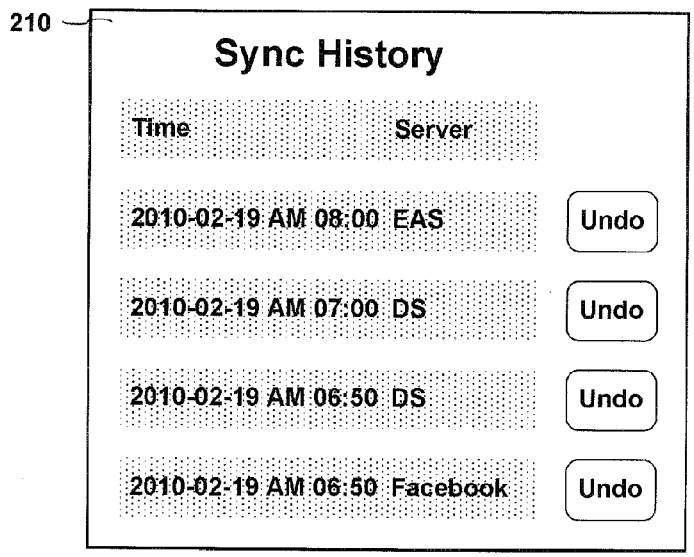
FIG. 2 is an exemplary view showing a data synchronization history displayed for each server on the mobile terminal.

FIG. 2 is an exemplary view showing a data synchronization history displayed for each server on the mobile terminal.

The controller 180 may display a history of data synchronization for each server. Referring to FIG. 2, the controller 180 may display a time at which synchronization is executed, a synchronized target server and an undo button for undoing data to a specific synchronized state.

When a user selects the undo button on the display 151 (touch screen), the controller 180 may undo the data synchronized with the corresponding server to a state or value prior to the synchronized time point.

For example, referring to FIG. 2, data synchronization with EAS server was executed at 8 am on Feb. 19, 2010. Here, if the synchronized data was confirmed as being partially lost or synchronized with wrong contents due to a server operation error, a communication error or the like, the user may undo the data to the state prior to the synchronization with the EAS server at 8 am on Feb. 19, 2010 (e.g., to a state at 8 pm on Feb. 18, 2010 if the latest synchronization was executed at 8 pm on Feb. 18, 2010)

The controller 180 may synchronize the undone data with a server via the wireless communication unit 110 or the interface unit 170. The controller 180 may allow the data stored in the server to be synchronized in correspondence with the undone data. That is, the data stored in the server is changed into the content or value of the undone data. Here, the controller 180 may synchronize the undone data with any server having the undone data as the synchronization target data, thereby maintaining data consistency in all of the servers and other mobile terminals, which are synchronized via all of the servers.

Alternatively, the controller 180 may requests data synchronization from the data synchronization service and accordingly, the data synchronization service may synchronize data with the server via the wireless communication unit 110 or the interface unit 170.

Figure 3:
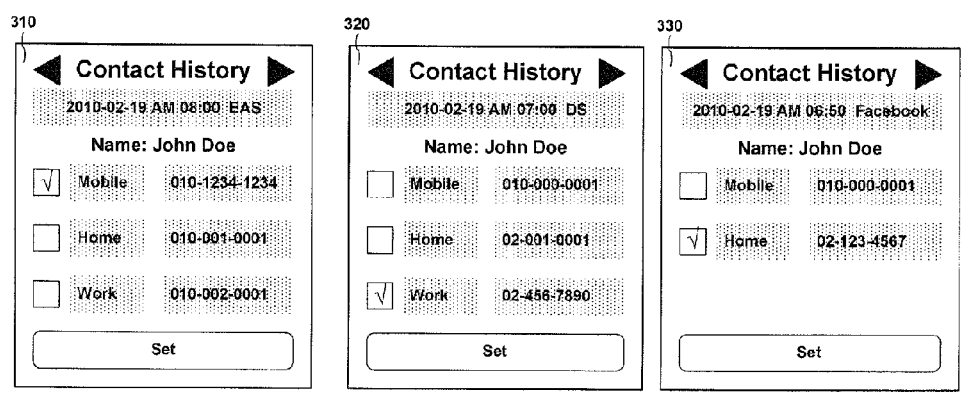
FIG. 3 is an exemplary view showing data synchronization histories displayed for each data on the mobile terminal.

FIG. 3 is an exemplary view showing data synchronization histories displayed for each data on the mobile terminal.

The controller 180 may display a history of data synchronization for each data. Referring to FIG. 3, the controller 180 may display a time at which the synchronization was executed, a synchronized target server, a name of synchronization target data, a detailed attribute value of the synchronization target data, a selection item for selecting data determined as correct data, and a button for setting current data to a selected data.

If a user, who found a wrong attribute value or field value in contact information, makes a selection to display a data synchronization history relating to the contact information, the controller 180, as shown in FIG. 3, displays the data synchronization history. If the user selects data determined as correct data from data synchronization history screens 310, 320, 330 for individual data displayed for each server and then selects the set button, the controller 180 sets the current data to contents or values of the selected data.

For example, a user, who found errors in a mobile phone number, a home phone number and an office phone number relating to John Doe, as shown in FIG. 3, may select a mobile phone number from a data synchronization history with an EAS server to set the current mobile phone number to the selected value, select an office phone number from a data synchronization history with a DS server to set the current office phone number to the selected value, and select a home phone number from a data synchronization history with a Facebook server to set the current home phone number to the selected value.

Afterwards, the function that the controller 180 is synchronized with the server may be understood by the description given with reference to FIG. 2, so it will be omitted.

Meanwhile, still referring to FIG. 3, the controller 180 has displayed the data synchronization histories for each server with respect to individual data. Unlike to this, the controller 180 may display every history information relating to individual data on one screen by simultaneously displaying synchronization target servers next each detailed attribute value in the form of text or icon. For instance, the controller 180 may display in the form of text or icon that an electronic mail address was synchronized with the Facebook server and a mobile phone number was synchronized with the DS server.

Figure 4:
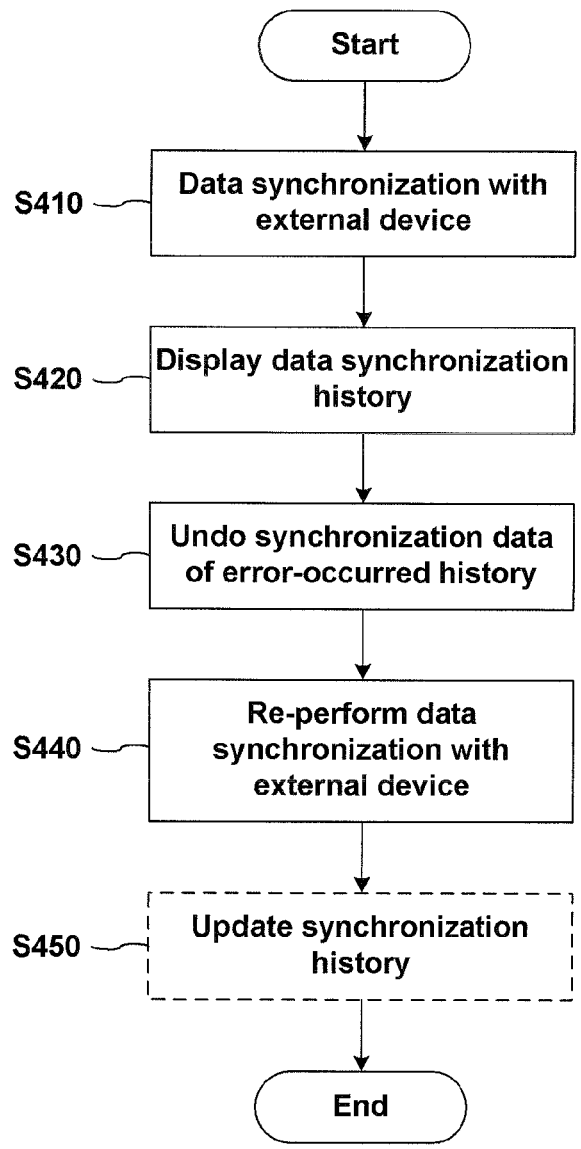
FIG. 4 is a flowchart showing a data synchronization method in a mobile terminal in accordance with one embodiment.

FIG. 4 is a flowchart showing a method for synchronizing data in a mobile terminal in accordance with one embodiment.

Referring to FIG. 4, the mobile terminal 100 performs a data synchronization with at least one external device (S410). The external device may be either a mobile terminal or a server, and the server may be either OMA Data Synchronization server or Exchange ActiveSync server.

The mobile terminal 100 displays a history of the performed data synchronization (S420). Here, the mobile terminal 100 may display the data synchronization history according to a user's selection or automatically upon synchronization. Also, the mobile terminal 100 may display the data synchronization history for each external device or each data. If the data synchronization history is displayed for each data, each data may be displayed for each external device, and the displayed data may be set to be toggled with each other.

The mobile terminal 100 undoes the synchronization data in a history having an error, of the displayed histories, to a state prior to the synchronization (S430). Here, the mobile terminal 100 may undo the synchronization data to the state prior to the synchronization according to a user's command or automatically upon occurrence of a synchronization error.

The mobile terminal 100 re-performs a data synchronization with the external device using the undone synchronization data (S440).

The mobile terminal 100 performs the data synchronization with the external device periodically or occasionally so as to update the synchronization history (S450).

The data synchronization method of the mobile terminal according to the one embodiment may be understood by the description of the mobile terminal according to the one embodiment given with reference to FIGS. 1 to 3, so a detailed description of the method will be omitted.

Also, the method according to the one embodiment can be implemented in a medium having a program recorded as processor-readable codes. Examples of such processor-readable media may include ROM, RAM, CD-ROM, magnetic tape, floppy disk, optical data storage element and the like. Also, such processor-readable medium may be implemented in a type of a carrier wave (e.g., a transmission via an Internet).

The mobile terminal described so far may be applied without being limited to the configuration and method of the embodiments, and all or part of the each embodiment can be selectively combined so as to derive many variations.

The exemplary embodiments have been described with reference to the accompanying drawings.

Here, terms or words used in the specification and claims should not be interpreted in typical or lexical meaning, but be construed in meaning and concept matching with the technical scope of the present disclosure.

Hence, the foregoing embodiments and advantages are merely exemplary and are not to be construed as limiting the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of controlling a mobile terminal, the method comprising:
   performing, via a controller on the mobile terminal, data synchronizations with at least one external device;
   displaying, via a display on the mobile terminal, a list of data synchronization history corresponding to the performed data synchronizations, wherein the list of data synchronizations is displayed in accordance with each external device;
   displaying, via the display, a data synchronization history screen corresponding to an external device selected from the list of data synchronizations, wherein the data synchronization history screen includes the list of data that was synchronized using the external device;
   detecting, via the controller, a current data corresponding to a selected data from the list of data synchronizations; and
   correcting, via the controller, the current data to the selected data.

2. The method of claim 1, wherein the external device is one of a mobile terminal or a server.

3. The method of claim 2, wherein the server is one of an Open Mobile Alliance (OMA) Data Synchronization server or Exchange ActiveSync server.

4. The method of claim 1, wherein the list of data synchronization history is displayed according to a user's selection or automatically upon performing the data synchronizations.

5. The method of claim 1, wherein the data synchronization history is displayed for each external device or for each data corresponding to the data synchronizations.

6. The method of claim 5, further comprising:
   when the data synchronization history is displayed for each data, displaying each data for said each external device; and
   setting the displayed data to be toggled with each other.

7. The method of claim 1, further comprising: undoing the correcting of the current data to the state prior to the performing of the data synchronizations according to a user's command or automatically upon an occurrence of the error.

8. The method of claim 1, further comprising:
   performing the data synchronizations with the external device periodically or occasionally to update the data synchronization history.

9. The method of claim 1, further comprising:
   synchronizing, via the controller, the selected data with any external device having the selected data as a synchronization target data.

10. The method of claim 1, further comprising:
    displaying, via the display, text or an icon next to the data in the list of data synchronizations, wherein the text or the icon is corresponding to a synchronization target external device.

11. A mobile terminal comprising:
    a wireless communication unit configured to perform data synchronizations with at least one external device;
    a display unit configured to display a list of data synchronization history corresponding to the performed data synchronizations, wherein the list of data synchronizations is displayed in accordance with each external device, and to display a data synchronization history screen corresponding to an external device selected from the list of data synchronizations, wherein the data synchronization history screen includes the list of data that was synchronized using the external device; and
    a controller configured to detect a current data corresponding to a selected data from the list of data and to correct the current data to the selected data.

12. The terminal of claim 11, wherein the external device is one of a mobile terminal or a server.

13. The terminal of claim 12, wherein the server is either Open Mobile Alliance (OMA) Data Synchronization server or Exchange ActiveSync server.

14. The terminal of claim 11, wherein the list of data synchronization history is displayed according to a user's selection or automatically upon performing the data synchronizations.

15. The terminal of claim 11, wherein the data synchronization history is displayed for each external device or for each data corresponding to the data synchronizations.

16. The terminal of claim 15, further comprising:
    when the data synchronization history is displayed for each data, displaying each data for said each external device; and
    setting the displayed data to be toggled with each other.

17. The terminal of claim 11, wherein the controller undoes the correcting of the current data to the state prior to the performing of the data synchronizations according to a user's command or automatically upon an occurrence of the error.

18. The terminal of claim 11, wherein the controller performs the data synchronizations with the external device periodically or occasionally to update the data synchronization history.

19. The terminal of claim 11, wherein the controller synchronizes the selected data with any external device having the selected data as a synchronization target data.

20. The terminal of claim 11, wherein the display displays text or icon next to the data in the list of data synchronizations, wherein the text or the icon is corresponding to a synchronization target external device.

* * * * *